United States Patent
Kelly et al.

(10) Patent No.: US 7,720,955 B1
(45) Date of Patent: May 18, 2010

(54) DETERMINING PERFORMANCE OF AN APPLICATION BASED ON TRANSACTIONS

(75) Inventors: Terence P. Kelly, Palo Alto, CA (US); Alex X. Zhang, San Jose, CA (US); Christopher C. Stewart, Rochester, NY (US)

(73) Assignee: Hewlett-Packard Development Company, L.P., Houston, TX (US)

(*) Notice: Subject to any disclaimer, the term of this patent is extended or adjusted under 35 U.S.C. 154(b) by 783 days.

(21) Appl. No.: 11/545,754

(22) Filed: Oct. 10, 2006

(51) Int. Cl.
*G06F 13/00* (2006.01)
(52) U.S. Cl. ..................................................... 709/223
(58) Field of Classification Search ................... 703/22; 709/223
See application file for complete search history.

(56) References Cited

U.S. PATENT DOCUMENTS

2006/0224375 A1* 10/2006 Barnett et al. ................. 703/22

OTHER PUBLICATIONS

Barrodale, I. et al., "An Improved Algorithm for Discrete/Linear Approximation", Siam J. Numer. Analysis, vol. 10, No. 5, Oct. 1973.
Morgan, S., "A Comparison of Simplex Method Algorithms", 1997.
ILOG, www.ilog.com, ILOG CPLEX, CPLEX algorithms, CPLEX interfaces, downloaded Oct. 10, 2006.

* cited by examiner

*Primary Examiner*—Robert B Harrell (57) ABSTRACT

A method for determining performance of an application in a system is described herein. The method includes receiving performance data of the application, the performance data includes a plurality of types of transactions performed by the application, a counted number of transactions for each of the plurality of transaction types as performed by the application, and a total service time by the system of the counted number of transactions of each of the plurality of transaction types; calibrating a performance model of the application in accordance with the received performance data; and calculating an expected performance of the application by the system based on the performance model calibration and the received performance data.

20 Claims, 5 Drawing Sheets

DETERMINING PERFORMANCE OF AN APPLICATION BASED ON TRANSACTIONS

BACKGROUND

Distributed applications play an increasingly crucial role in business critical enterprise operations. Consequently, they continue to grow in scale and complexity. Users and providers of computing systems and distributed enterprise applications therein value application-level performance because an unresponsive application may directly reduce revenue or productivity. Unfortunately, understanding application-level performance in complex modern distributed systems is difficult for several reasons. Today's commercial production applications are composed of numerous opaque software components running atop virtualized and poorly-instrumented physical resources. Furthermore, the workloads imposed by such applications on distributed systems are highly nonstationary in the sense that the relative frequencies of transaction types in the workload vary considerably over time.

To make matters worse, applications are increasingly distributed in enterprise systems that span both geographical and organizational boundaries. Each enterprise system often executes each application, and each sub-application therein, on separate machines (e.g., servers) to isolate the effects of software faults and workload spikes. The machines themselves may span both geographical and organizational boundaries. Thus, compared with such machine-granularity application boundaries, application consolidation (i.e., consolidating multiple applications that run on individual, often under-utilized, machines or systems onto a smaller number of more highly-used ones) has several advantages, including better resource utilization and lower management and maintenance overheads. However, the mere task of collecting in one place sufficient performance data and knowledge of system design to support a detailed performance analysis for a system evaluation or an application consolidation is often very difficult in practice. Also, rapidly-changing application designs and configurations limit the useful lifespan of an analysis once it has been performed. In addition, workload fluctuations in consolidated environments may have complex effects on application-level performance which reduce the overall predictability of the system.

For the above reasons, operators and administrators seldom analyze running production systems except in response to measurements (or user complaints) indicating unacceptably poor performance or in response to a need or desire for application consolidation.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for determining performance of an application or consolidation thereof. As referred herein, determining performance in an application includes either or both detecting performance anomalies (i.e., knowing when performance is surprising, given a known workload) and predicting performance (given forecasts of future application workload). While conventional performance-determination models implicitly assume stationary application workloads, various embodiments of the present invention provide performance-determination models that seek to exploit the nonstationarity of application workloads to circumvent the need for time-intensive or invasive instrumentation and controlled benchmarking during calibration of performance-determination models. This is because, through the derivation of various novel performance-determination models described herein, it has been found that lightweight passive measurements of response times and utilization collected under stationary workloads cannot be used for model calibration. Thus, according to various embodiments of the present invention, calibration of performance-determination models exploit variations in transaction volume, transaction mix, and resource utilization in the calibration data, i.e., the kind of nonstationarity found in real application workloads.

While performance anomaly detection and performance prediction do not directly identify the root causes of performance or of a particular anomaly thereof, they indirectly aid performance diagnosis in numerous ways. The system analyst's task is then simplified if she can quickly determine whether the problem is due to excessive workload so as to guide the analyst's choice of tools. For example, if a performance problem is detected and determined to be due to excessive workload, a resource bottleneck analysis may be desired, and the solution may be as simple as provisioning additional resources for the application or avoiding consolidation of the application. However, if the performance problem is not due to overload, this may suggest a fault in the application logic or configuration, and one simple remedial measure is to re-start affected application software components in addition to a logic/configuration analysis.

In another example, anomaly detection may be made in cases where transactions complete "too quickly," e.g., because they abort prematurely. On the other hand, a prediction of good performance of consolidated applications in a shared system may suggest that such a consolidation is feasible. If the application is a large and complex distributed enterprise application, such as a globally-distributed application, and different organizations manage the application and the system on which it runs, quickly determining whether workload accounts for poor performance may decide who is responsible for fixing the problem.

Furthermore, a performance prediction may assist with capacity planning, whereby different workloads may be tested in the application to explore "what-if" scenarios and determine the most acceptable application performance or different applications may be consolidated into a shared system or infra-structure. In one embodiment, a good performance prediction in an application enables application operators to explore a wide range of important "what-if" scenarios, e.g., "how will mean response times at my E-commerce site change if the number of shoppers doubles and the buy:browse ratio increases by 50%?"

Figure 1:
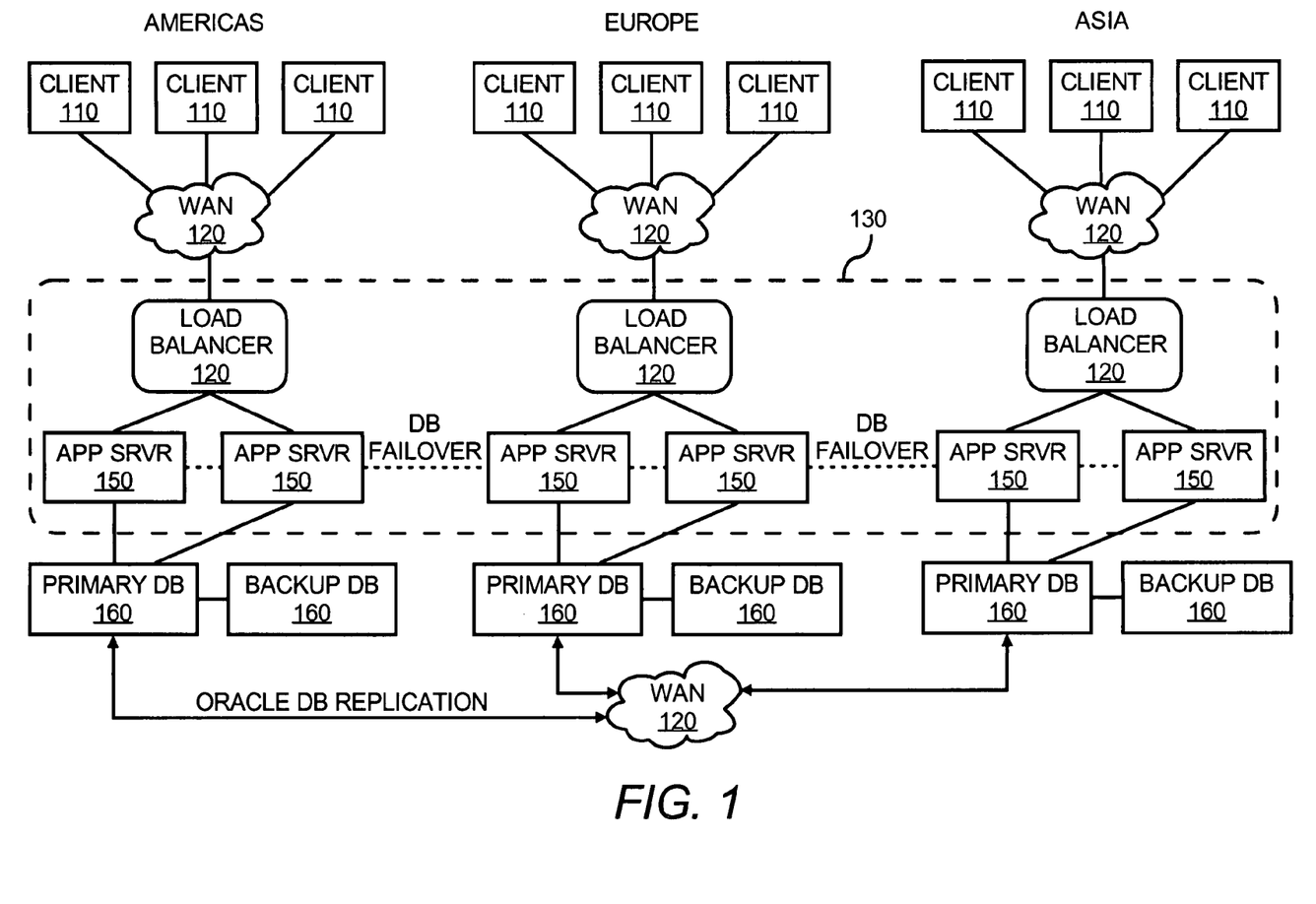
FIG. 1 illustrates an exemplary high-level architecture of a system in which a distributed enterprise application operates or is executed, and in which the performance of such an application may be determined in accordance with various embodiments of the present invention.

FIG. 1 illustrates an exemplary high-level architecture of a system 100 in which a distributed enterprise application operates or is executed, and in which the performance of such an application may be determined in accordance with various embodiments of the present invention. The system 100 includes a number of client devices 110 that have access to the application in the managed application servers 130, as indicated by the dashed line, through a number of Wide Area Networks (WANs) 120. The same or different organizations may manage the application and the system 100 on which it runs. Load balancers 140 associated with the managed application servers 130 apportion incoming client sessions across, e.g., Web servers (not shown), which serve static page requests directly and pass more complex transactions to the application servers 150 and database servers 160 below them (as shown in the managed application servers 130). As referred herein, a transaction is any one or more processing actions performed by one or more components in the system 100 in support of the application running thereon.

There are a number of properties typical of large distributed enterprise applications. First, the workload performed by such applications is composed of request-reply transactions. Second, transactions occur in a small number of types, such as "log-in," "browse," "add to cart," and "check out" for an E-commerce site, whereby different types of transactions (i.e., a transaction mix) are performed by the application. Third, resource demands vary widely across but not within transaction types. This is because transaction types often determine the run-time code path through the application logic, which in turn strongly influences resource service demands. Fourth, resources are adequately provisioned or over provisioned, so transaction response times often include largely service times, not queuing times. However, queuing time may be non-negligible and may need to be taken into account. Adequate resource provision is a fundamental requirement of capacity planning in business-critical applications. By design, allocated capacity is generous relative to offered workload; heavy load and overload represent serious failures of the capacity planning process. Fortunately they are rare because capacity planning for intra-enterprise applications can often exploit good estimates of the total user population and anticipated usage patterns. Fifth, crucial aspects of workload are statistically non-stationary, i.e., the frequency distributions of key workload characteristics vary dramatically over time.

Process

According to various embodiments, the aforementioned application properties are exploited to develop various models for determining performance of the application and consolidation thereof. All models have the same general high-level form:

$$P = F_{\vec{a}}(\vec{W}). \quad \{1\}$$

P is a scalar summary of application performance, measuring the aggregate transaction response time within predetermined short-time windows, such as five-minute intervals. This performance measure may be easily converted to average response time because the number of transactions in the workload within each time window are known. F specifies the functional form of each model, $\vec{a}$ is a vector of calibrated parameters, and $\vec{W}$ is a vector of workload, or transaction mix, characteristics. The inputs to these models correspond to readily available passive measurements of applications and their underlying system resources.

In one embodiment, a basic performance model is generated based on the transaction mix that is performed by the application. Accordingly, it has access to a transaction log of the application that records the type and response time of each transaction at a particular time, which is divided into predetermined non-overlapping intervals, e.g., five minutes. In this embodiment, for time interval i, with $N_{ij}$ denoting the observed or recorded number of transactions of type j that began during the interval, $T_{ij}$ denoting the sum of their response times, and $\alpha_j$ denoting a model parameter representing a typical (or alternatively, average) service time, or response time, of resources for the transaction of type j in the application, the basic performance model then takes on the form of:

$$y_i = \sum_j T_{ij} = \alpha_1 N_{i1} + \alpha_2 N_{i2} + \ldots, \quad \{2\}$$

where $y_i$ represents the performance value at each time interval i. The basic performance model is constrained to pass through the origin, that is, the aggregate response time is zero for time intervals that have no transactions. For given vectors of values $a_j$ for the corresponding model parameters $\alpha_j$ and observed transaction mix $N_{ij}$, at time interval i, the fitted performance value $\hat{y}_i$ of the basic performance model at time i is calculated from Equation 2 and takes form of:

$$\hat{y}_i = F_{\vec{a}}(\vec{N}_i) = \sum_j a_j N_{ij}. \quad \{3\}$$

The model error, or residual, $e_i$ at each time interval i is calculated as the difference between the basic performance model value $y_i$ and its fitted value $\hat{y}_i$, or:

$$e_i = y_i - \hat{y}_i. \quad \{4\}$$

Accordingly, the accuracy of the basic performance model is defined as a generalization of the familiar concept of relative error:

$$\text{normalized aggregate error} = \frac{\sum_i |e_i|}{\sum_i y_i}. \quad \{5\}$$

Thus, in one embodiment, the basic performance model of the form shown in Equation 2 is optimal if it minimizes the normalized aggregate error in Equation 5.

Figure 2:
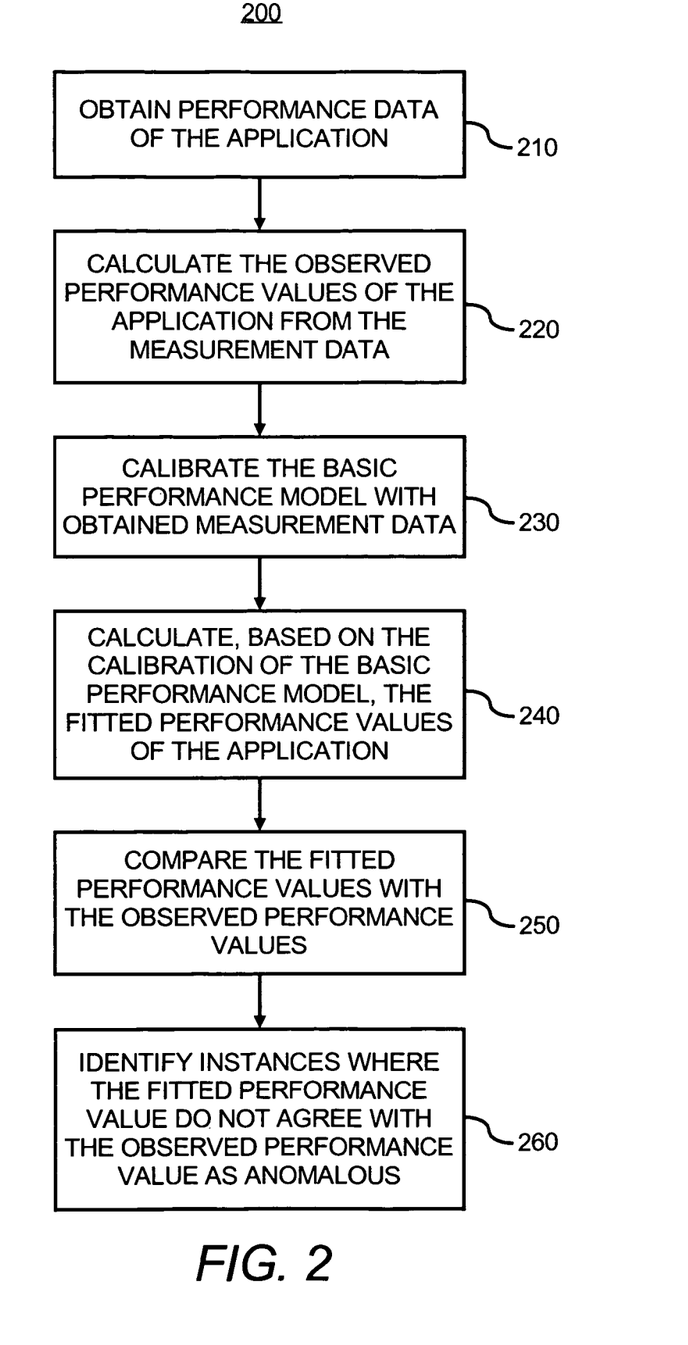
FIG. 2 illustrates a flowchart diagram of a method for employing a performance model to determine performance of an application operating in a system, in accordance with one embodiment of the present invention.

FIG. 2 illustrates a flowchart diagram of a method 200 for employing the aforementioned basic performance model to determine performance of an application operating in a system, such as the system 100 shown in FIG. 1. It should be understood that the method 200 is discussed in the context of the system 100 for illustrative purposes only and not to be limiting thereof.

At 210, measurement or observed performance data of an application running in the system 100 (or servicing of the application by the system 100) is obtained or received. The performance data includes the various transaction types j (or transaction mix) performed by the application, the number $N_{ij}$ of each transaction type j performed by the application at each predetermined time interval i for a predetermined period of time, and the sum of the service times or response times, i.e., the combined or total service time, $T_{ij}$ of all transactions of each transaction type j at each predetermined time interval i by the system 100. The performance data $N_{ij}$ and $T_{ij}$ are readily available. For example, if the application is for operating a multi-tiered Web site with the system 100, each of the application servers 150 and Web servers (not shown) may be configured to passively log the performance data in its access or transaction log. In another example, a data collection module having one or more data collectors may be employed to actively obtain the performance data from the system 100. A data collection module, and likewise, a data collector, may be one or more software programs, applications, or modules having computer executable program instructions that include code from any suitable computer-programming language, such as C, C++, C#, Java, or the like.

At 220, the measured or observed performance values at each time interval i in the predetermined period of time is calculated or computed as the respective sum of the observed performance data $T_{ij}$ at such a time interval i, as shown in Equation 2.

At 230, calibration of the basic performance model is performed, wherein parameter values $a_j$ are calculated for the model parameters $\alpha_j$, by fitting the basic performance model in Equation 2 to the obtained performance data $N_{ij}$ and $T_{ij}$. Numerous methods exist for deriving the parameter values $a_j$ from the performance data. For example, a method known as the Ordinary Least-Squares (OLS) multivariate regression may be used. Such a method may be found in widely-available statistical software, such as the R statistical software package available from the non-profit R Foundation in Vienna, Austria, and commercial spreadsheets, such as MICROSOFT EXCEL. In another example, a method known as Least Absolute Residuals (LAR) regression may be used in order to minimize the sum of absolute residuals $\Sigma_i |e_i|$, and thus, the normalized aggregate error in Equation 3. Such a method may be found in general-purpose Linear Program (LP) solvers, such as the Simplex method or the CPLEX software available from ILOG Corporation of Mountain View, Calif., or specialized algorithms, such as the one described by K. Barrodale and F. Roberts in "An improved algorithm for discrete L1 linear approximations," *SIAM Journal of Numerical Analysis*, 1973, pp. 10:839-848. Consequently, the output of the model calibration is a set of parameter values $a_j$ for the model parameters $a_j$.

At 240, the measured transaction counts $N_{ij}$ and the calculated parameter values $a_j$ are fed into Equation 3, which is the basic performance model in Equation 2 with the model parameters $\alpha_j$ substituted by their corresponding parameter values $a_j$, to calculate the fitted or expected performance values $\hat{y}_i$. Thus, $\hat{y}_i$ is calculated based on the calibration of the basic performance model.

At 250, the fitted performance values $\hat{y}_i$ are compared with the observed performance values $y_i$ to assess the accuracy of the basic performance model. That is, the model error $e_i$ at each time interval i is calculated.

At 260, if the fitted performance values $\hat{y}_i$ agree closely with the corresponding observed performance values $y_i$ for most time intervals i (that is, the model error $e_i$ is within a predetermined threshold value), then identify those instances, or time intervals i, where $\hat{y}_i$ do not closely agree with $y_i$ as anomalous. Thus, a performance anomaly is detected. At this stage, if an application's performance is poor, but a performance anomaly is not detected, additional information may be provided to a user, such as a system or application operator or administrator, to indicate that the slow performance is not surprising because of the current workload. However, if a performance anomaly is detected, the affected system components may be automatically restarted to reset possible faulty logic or configuration and see whether performance improves from such a restart.

Accordingly, performance determination is done in real time. At the close of every time interval or window i (e.g., every five minutes), the basic performance model is fitted to all available data (e.g., from the previous week or month) and the most recent data point is checked to see whether it is anomalous. Furthermore, the basic performance model exploits knowledge of the transaction mix $N_{ij}$ in the workload and does not employ time series analysis. If the given transaction mix N, in Equation 3 represents past workload, the fitted value $\hat{y}_i$ may be interpreted as the model's calculation of what aggregate response time should have been during the time interval i. On the other hand, if the given transaction mix $N_{ij}$ represents a forecast of a future workload, the fitted value $\hat{y}_i$ may represent the model's performance prediction. It should be noted that because the total number of transactions within a time interval is known, that is, $\Sigma_j N_{ij}$, the fitted value $\hat{y}_i$ representing the aggregate response time may be converted into an average response time.

Figure 3:
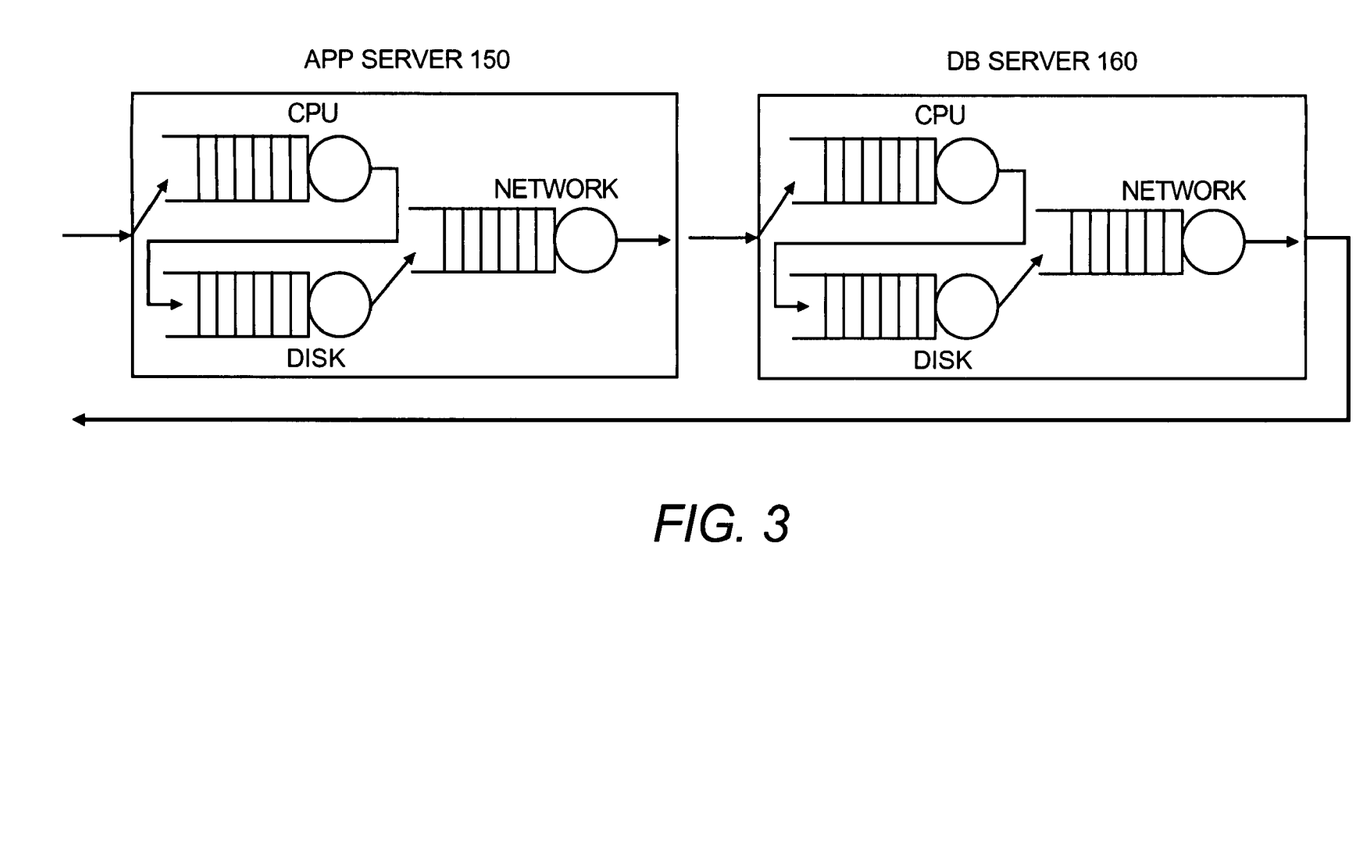
FIG. 3 illustrates a queuing network modeling of the path that transactions of an application follow as they are processed by a system, such as the system in FIG. 1, in accordance with one embodiment of the present invention.

The aforementioned basic performance model does not explicitly consider the possibility of queuing times, or waiting times, that may occur when transactions are queued for the availability of resources, such as CPUs, memory drives, and networking switches, in the system 100 (FIG. 1) that are needed to run the transactions. FIG. 3 illustrates a queuing network modeling of the path that transactions of an application follow as they are processed by the system 100 (FIG. 1), wherein the circles represent resources in the system 100 and the scored rectangles to the left of each circle represent queues where transactions may need to wait, or queue, before receiving service by the particular resource. Although FIG. 3 shows only two tiers with three resources each, it should be understood that certain applications may be serviced by additional tiers (e.g., for a Web server) and additional resources and accumulate additional waiting times.

Accordingly, in one embodiment of the present invention, there is provided an extended performance model that is the basic performance model extended with additional terms to take into account the waiting times as the application traverses through the system 100. That is:

$$y_i = \sum_j T_{ij} = \sum_j \alpha_j N_{ij} + \left(\sum_j N_{ij}\right)\left(\sum_r \alpha_r \frac{U_{ir}}{(1-U_{ir})}\right). \quad \{6\}$$

The right most terms, i.e., those terms that are in addition to the basic performance model, represent waiting times in a basic M/M/1 queuing model, with one queue per resource. $U_{ir}$ denotes the utilization of resource r during each time interval i.

According to another embodiment of the present invention, there is provided a second extended performance model that is the basic performance model extended with different additional terms to account for the waiting times, as shown in the following equation:

$$y_i = \sum_j T_{ij} = \sum_j a_j N_{ij} + \left(\sum_j N_{ij}\right)\left(\sum_r \frac{1}{\lambda_i} \cdot \frac{U_{ir}^2}{(1-U_{ir})}\right), \quad \{6'\}$$

where all the variables are as described earlier, and $\lambda_i$ is the overall arrival rate at the system 100 of transactions of all types in the time interval i, as obtained or received from the performance data of the application. The term $\lambda_i$ relates to the term $$\left(\sum_j N_{ij}\right)$$

in the following way:

$$\lambda_i = \left(\sum_j N_{ij}\right) / L$$

where L is the length of the measurement interval (such as 30 seconds), so that $$\left(\sum_j N_{ij}\right)\frac{1}{\lambda_i}$$

can be simplified to L. The term $\lambda_i$ can also indicate the arrival rate at each of the resources. For example, if the overall arrive rate is 50 per second, but only 90% of the 50 eventually reach a particular resource in the system 100, then the arrival rate to the particular system resource is 90% of 50, or 45 per second.

Figure 4:
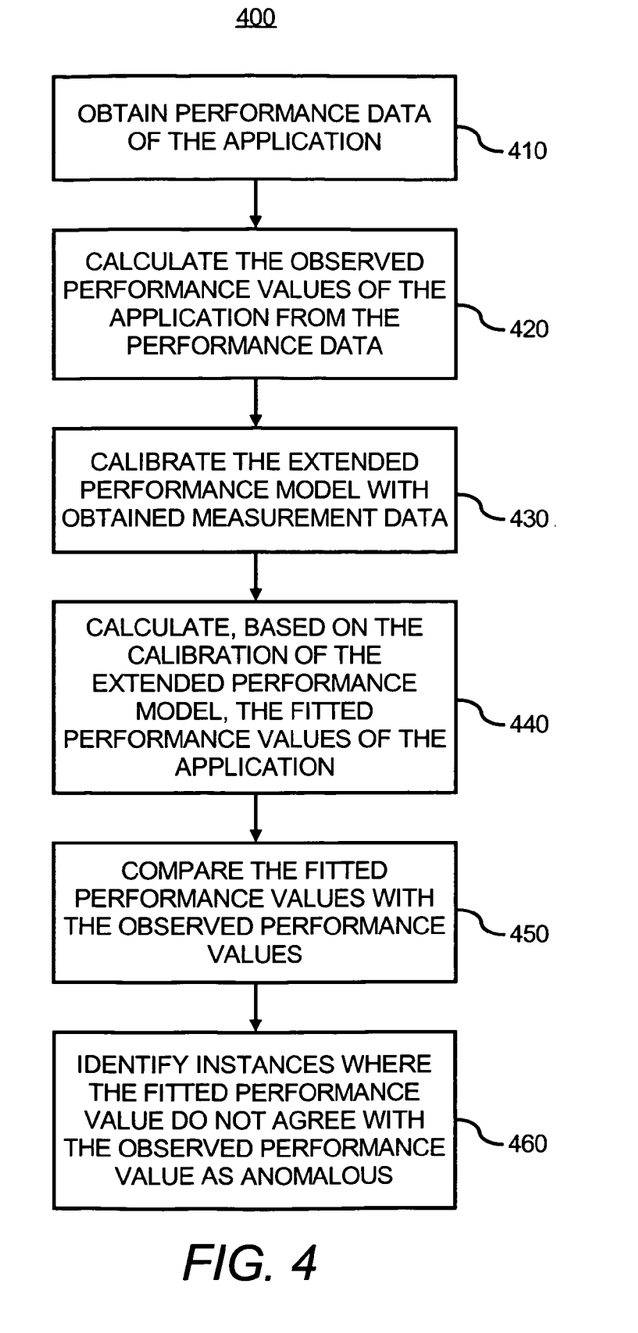
FIG. 4 illustrates a flowchart diagram of a method for employing another performance model to determine performance of an application operating in a system, in accordance with one embodiment of the present invention.

FIG. 4 illustrates a flowchart diagram of a method 400 for employing the aforementioned extended performance model, in either Equation 6 or 6', to determine performance of an application operating in a system, such as the system 100 shown in FIG. 1. Although FIG. 4 and subsequent discussions refer to the extended performance model in Equation 6, it should be understood that FIG. 4 and such discussions are also application to the extended performance model in Equation 6'. The method 400 is similar to the method 200 described earlier for the basic performance model, except for those differences described below. It should be understood that the method 400 is discussed in the context of the system 100 for illustrative purposes only and not to be limiting thereof.

At 410, measurement or observed data about the operation of the application in the system 100 (or servicing of the application by the system 100) is obtained. The performance data includes, as in the method 200, the various transaction types j (or transaction mix) performed by the application, the number $N_{ij}$ of each transaction type j performed by the application at each predetermined time interval i for a predetermined period of time, and the sum of the service times or response times, i.e., the combined or total service time, $T_{ij}$ of all transactions of each transaction type j at each predetermined time interval i by the system 100. Additionally, the performance data includes observed system resource utilizations $U_{ir}$ collected where appropriate measurement is possible. Again, the performance data $N_{ij}$, $T_{ij}$, and $U_{ir}$ are readily available from an access or transaction log in the system 100 or a data collection module having one or more data collectors for collecting such data.

At 420, each observed actual performance value $y_i$ is calculated as the respective sum of the observed performance data $T_{ij}$ for all transaction types j over each time interval i.

At 430, calibration of the extended performance model is performed, wherein parameter values $a_j$ for the model parameters $\alpha_j$ and, additionally, parameter values $a_r$ for the model parameters $\alpha_r$ are calculated by fitting the extended performance model in Equation 6 to the obtained performance data $N_{ij}$, $T_{ij}$, and $U_{ir}$. The aforementioned methods used in the basic performance model for deriving the parameter values $a_j$ from the performance data may be employed here as well. Consequently, the output of the model calibration is a set of parameter values $a_j$ for the model parameters $\alpha_j$ and a set of parameter values $a_r$ for the model parameters $\alpha_r$.

At 440, the measured transaction counts $N_{ij}$ and resource utilizations $U_{ir}$ and the calculated parameter values $a_j$ and $a_r$ are fed into the following equation:

$$\hat{y}_i = F_{\vec{a}}(\vec{N}_i, \vec{U}_{ir}) = \sum_j a_j N_{ij} + \left(\sum_j N_{ij}\right)\left(\sum_j a_r \frac{U_{ir}}{(1-U_{ir})}\right), \quad \{7\}$$

which is the extended performance model in Equation 6 with the model parameters $\alpha_j$ and $\alpha_r$ substitute by their corresponding parameter values $a_j$ and $a_r$, respectively, to calculate the fitted performance values $\hat{y}_i$. Thus, $\hat{y}_i$ is calculated based on the calibration of the extended performance model. As with the basic performance model, it should be noted that because the total number of transactions within a time interval is known, that is, $\Sigma_j N_{ij}$, the fitted value $\hat{y}_i$ representing the aggregate response time may be converted into an average response time.

At 450, the fitted performance values $\hat{y}_i$ are compared with the observed performance values $y_i$ to assess the accuracy of the extended performance model. That is, the model error $e_i = y_i - \hat{y}_i$ at each time interval i is calculated.

At 460, if the fitted performance values $\hat{y}_i$ agree closely with the corresponding observed performance values $y_i$ for most time intervals i (that is, the model error $e_i$ is within a predetermined threshold value), then identify those instances, or time intervals i, where $\hat{y}_i$ do not closely agree with $y_i$ as anomalous.

As with the basic performance model, performance determination is done in real time with the extended performance model. If the given transaction mix $N_{ij}$ in Equation 7 represents past workload, the fitted value $\hat{y}_i$ may be interpreted as the model's calculation of what aggregate response time should have been during the time interval i. However, unlike the basic performance model, because the extended performance model relies on the resource utilizations $U_{ir}$, it cannot be used to predict performance based on the transaction mix $N_{ij}$ alone, even if such a transaction mix represents a forecast of a future workload.

Accordingly, in another embodiment of the present invention, a composite model is generated by estimating the resource utilizations $U_{ir}$ as weighted sums of transaction counts in the following utilization model:

$$U_{ir} = \beta_{0r} + \sum_j \beta_{jr} N_{ij}, \quad \{8\}$$

where $\beta_{jr}$ represents the service demand of transaction type j on resource r. The total service demand $U_{ir}$ placed on the resource is the sum of service demands of all transactions of all transaction types. As with the aforementioned basic performance model, the values for the model parameters $\beta_{jr}$ for each resource r is obtained during model calibration. Unlike the basic performance model, however, an intercept term $\beta_{0r}$ is included in the composite or utilization model in Equation 8, because real system resources are not entirely idle even in the complete absence of application workload.

Once the utilization estimates $\hat{U}_{ir}$ are obtained from a calibrated utilization model, as represented by Equation 8, they are substituted into a calibrated extended model, based on Equation 7 to obtain a composite model of aggregate response time as a function of the transaction mix $N_{ij}$, as further described below with reference to FIG. 5. In rare cases where $\hat{U}_{ir} < 0$ or $\hat{U}_{ir} \geq 1$, the utilization estimate is set to zero or $1-\epsilon$, respectively (where $\epsilon$ is a predetermined small fractional number, e.g., 0.01).

Again, the accuracy of the extended model is the same as that of the basic performance model, or:

$$\text{normalized aggregate error} = \frac{\sum_i |e_i|}{\sum_i y_i}. \quad \{9\}$$

Figure 5:
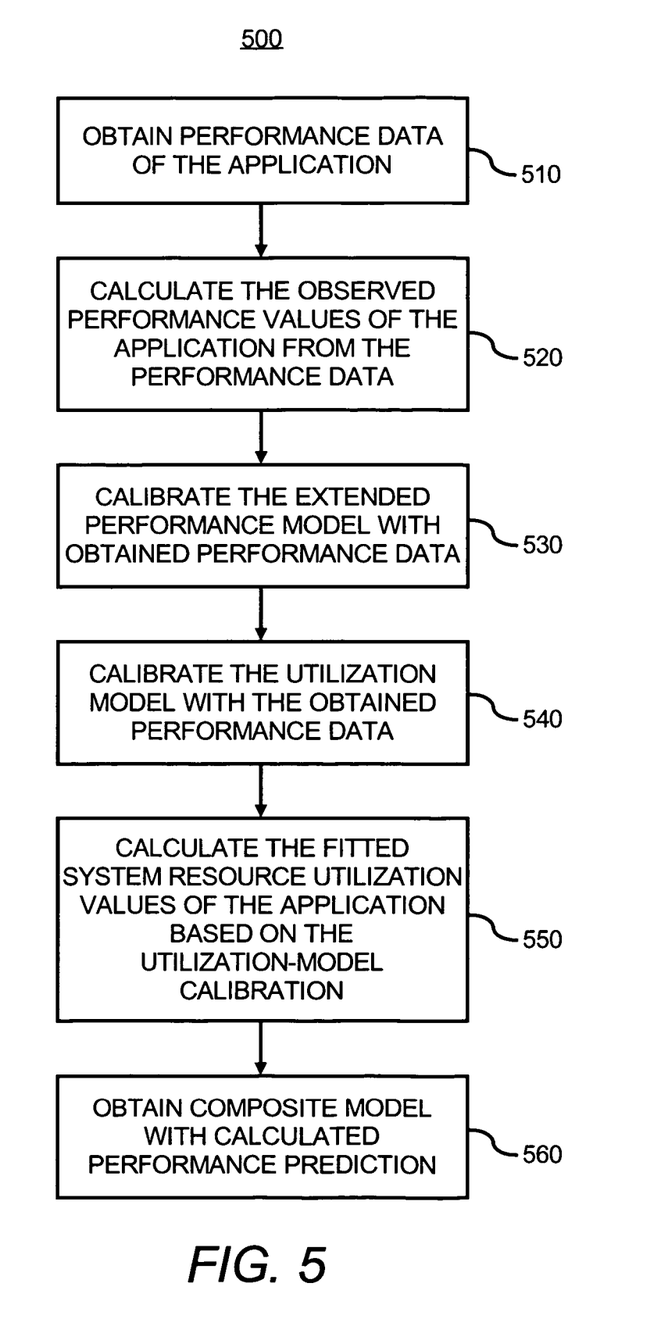
FIG. 5 illustrates a flowchart diagram of a method for deriving and employing still another performance model to determine performance of an application operating in a system, in accordance with one embodiment of the present invention.

FIG. 5 illustrates a flowchart diagram of a method 500 for deriving and employing the aforementioned composite performance model to determine performance of an application operating in a system, such as the system 100 shown in FIG. 1. The method 500 is similar to the method 400 described earlier for the extended performance model, except those differences described below. It should be understood that the method 500 is discussed in the context of the system 100 for illustrative purposes only and not to be limiting thereof.

At 510, measurement or observed data about the operation of the application in the system 100 (or servicing of the application by the system 100) is obtained. As with the extended performance model described earlier, the performance data includes the various transaction types j (or transaction mix) performed by the application, the number $N_{ij}$ of each transaction type j performed by the application at each predetermined time interval i for a predetermined period of time, the sum of the service times or response times, i.e., the combined or total service time, $T_{ij}$ of all transactions of each transaction type j at each predetermined time interval i by the system 100, and the observed system resource utilizations $U_{ir}$ collected at the application server tier 130. Again, the performance data $N_{ij}$, $T_{ij}$ and $U_{ir}$ are readily available from an access or transaction log in the system 100 or a data collection module having one or more data collectors for collecting such data.

At 520, each measured or observed performance value $y_i$ is calculated as the respective sum of the observed performance data $T_{ij}$ for all transaction types j over each time interval i.

At 530, calibration of the extended performance model, wherein parameter values $a_j$ for the model parameters $\alpha_j$ and, additionally, parameter values $a_r$ for the model parameters $\alpha_r$ are calculated by fitting the extended performance model in Equation 6 to the obtained performance data $N_{ij}$, $T_{ij}$, and $U_{ir}$. The aforementioned OLS or LAR methods used in the basic performance model for deriving the parameter values $a_j$ from the performance data may be employed here as well. Consequently, the output of the model calibration is a set of parameter values $a_r$ for the model parameters $\alpha_j$ and a set of parameter values $a_r$ for the model parameters $\alpha_r$.

At 540, calibration of the utilization model for service demand, as represented in Equation 8, is performed, whereby the parameter values $b_{jr}$ for the model parameters $\beta_{jr}$ are calculated by fitting the utilization model to the obtained performance data $U_{ir}$ and $N_{ij}$. Again, the aforementioned OLS or LAR regression methods may be employed here for the fitting. Consequently, the output of the utilization-model calibration is a set of parameter values $b_{jr}$ for the model parameters $\beta_{jr}$.

At 550, the forecasted transaction counts $N_{ij}$ (which are different from the obtained $N_{ij}$ of past performance data above) and the calculated parameter values $b_{jr}$ for the model parameters $\beta_{jr}$ are fed into the utilization model in Equation 8 as follows:

$$\hat{U}_{ir} = \beta_{0r} + \sum_j b_{jr} N_{ij}, \quad \{10\}$$

which is based on the utilization model in Equation 8, to calculate the fitted system resource utilizations $\hat{U}_{ir}$. As noted earlier, In rare cases where $\hat{U}_{ir} < 0$ or $\hat{U}_{ir} \geq 1$, the utilization estimate is set to zero or $1-\epsilon$, respectively.

At 560, the same measured transaction counts $N_{ij}$, the fitted system resource utilizations $\hat{U}_{ir}$ calculated above, and the calculated parameter values $a_j$ and $a_r$ from the calibrated extended-performance-model are fed into the extended Equation 8 to form the following composite model:

$$\hat{y}_i = F_{\vec{a}}(\vec{N}_i, \vec{U}_{ir}) = \sum_j a_j N_{ij} + \left(\sum_j N_{ij}\right)\left(\sum_j a_r \frac{\hat{U}_{ir}}{(1-\hat{U}_{ir})}\right), \quad \{11\}$$

wherein the fitted performance values $\hat{y}_i$ represent the model's performance prediction.

According to one embodiment, the composite model is operable to predict performance in an application consolidation, whereby system-wide performance in consolidated environments are predicted by combining the composite models of each target application running in isolation, whereby the transaction mix vectors $\vec{N}_i$ in the composite models of the target applications are concatenated, and the resource utilizations $U_{ir}$ in such composite models are summed up. In other words, the predicted performance value or system-wide sum of response times in each time interval i for, for example, two consolidated applications in a shared system or infrastructure is:

$$\hat{y}_i = \sum_{j=1}^{n'+n''} \alpha_j N_{ij} + \sum_r \left( \frac{1}{\lambda_i} \cdot \frac{(U'_{ir} + U''_{ir})^2}{1 - (U'_{ir} + U''_{ir})} \right) \cdot \sum_{j=1}^{n'+n''} N_{ij}, \quad \{12\}$$

where the superscripts ('and") distinguish between the two applications. For brevity, a unified $a_j$ and $N_j$ represent the concatenation of each application's individual parameters. The variable n represents the number of transaction types, $U_{ir}$ represents the service demand or utilization of resource r, and $\lambda_i$ represents the post-consolidation arrival rate of both applications. It should be understood that the consolidation model as represented by Equation 12 may be extended to handle the consolidation of more than two applications. The consolidation model assumes that an application's resource requirements do not decrease after consolidation, which may happen if the target applications interact or share data.

According to another embodiment, it is possible to manipulate the consolidation model of Equation 12 to derive performance predictions for each application under consolidation by considering the sum of the transaction types ('and") corresponding to a target application. Specifically, the derived per-application performances under consolidation are:

and $$\hat{y}'_i = \sum_{j=1}^{n'} \alpha_j N_{ij} + \sum_r \left( \frac{1}{\lambda_i} \cdot \frac{(U'_{ir} + U''_{ir})^2}{1 - (U'_{ir} + U''_{ir})} \right) \cdot \sum_{j=1}^{n'} N_{ij}, \quad \{13\}$$

$$\hat{y}''_i = \sum_{j=n'+1}^{n'+n''} \alpha_j N_{ij} + \sum_r \left( \frac{1}{\lambda_i} \cdot \frac{(U'_{ir} + U''_{ir})^2}{1 - (U'_{ir} + U''_{ir})} \right) \cdot \sum_{j=n'+1}^{n'+n''} N_{ij}. \quad \{14\}$$

The methodology for employing Equations 12-14 to predict performance in an application consolidation follows the method 500 as described above for deriving and employing the composite model, wherein one of the Equations 12-14 is used in place of the extended model in Equation 6 or 6' to derive the performance prediction for the application consolidation. It should be noted that the performance data that is used in Equations 12-14 is the performance data of each application under consolidation singly individually in the system 100. Thus, it is assumed that additional costs of resource sharing (e.g., context switching) are negligible.

System

In one embodiment, the various models described above for performance determination and application consolidation may be implemented by one or more software programs, applications, or modules having computer-executable programs that include code from any suitable computer-programming language, such as C, C++, C##, Java, or the like, which are executable by a computerized system, which includes a computer or a network of computers. Examples of a computerized system include but are not limited to one or more desktop computers, one or more laptop computers, one or more mainframe computers, one or more networked computers, one or more processor-based devices, or any similar types of systems and devices. Thus, the computerized system includes one or more processors of any of a number of computer processors, such as processors from Intel, Motorola, AMD, Cyrix. Each processor is coupled to or includes at least one memory device, such as a computer readable medium (CRM). The processor is operable to execute computer-executable programs instructions stored in the CRM, such as the computer-executable programs to implement one or more of the aforementioned models for performance determination, application consolidation, or both. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable read instructions.

Alternative embodiments are contemplated wherein each of the models for performance determination and application consolidation is executed by a separate computerized system, or wherein some of the models are executed by one computerized system and other models are executed by another computerized system.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for determining performance of an application in a system, comprising:
    storing a performance model for the application in a data storage device;
    receiving performance data of the application, the performance data includes a plurality of types of transactions performed by the application, a counted number of transactions for each of the plurality of transaction types as performed by the application, and a total service time by the system of the counted number of transactions of each of the plurality of transaction types;
    calibrating, using a hardware processor, the stored performance model of the application in accordance with the received performance data, wherein the calibrating includes fitting the performance data to the performance model to determine parameter values for model parameters in the performance model; and
    calculating an expected performance of the application by the system based on the performance model calibration and the received performance data.

2. The method of claim 1, further comprising:
    including in the performance model for calibrating an accounting of a queuing time of each of the plurality of transaction types in the system.

3. The method of claim 2, further comprising:
    receiving predicted performance data, including a predicted plurality of types of transactions to be performed by the application, a predicted number of transactions for each of the predicted plurality of transaction types to be performed by the application;
    providing a utilization model of the application modeling a total service demand placed on resources in the system for executing the application therein; and
    calibrating the utilization model of the application in accordance with the predicted performance data as received.

4. The method of claim 3, wherein calculating the expected performance of the application comprises:
calculating, based on the calibrated utilization model in addition to the performance model calibration and the received performance data, the expected performance as a predicted performance of the application for the predicted performance data.

5. The method of claim 3, wherein calculating the expected performance of the application comprises:
calculating, based on the calibrated utilization model in addition to the performance model calibration and the received performance data, the expected performance of the application for the predicted performance data; and
the method further comprising:
comparing the measured performance with the expected performance to determine any difference between the two performances; and
detecting a performance anomaly of the application upon the comparing indicating a difference between the measured performance and the expected performance that is greater than or substantially equal to a predetermined threshold.

6. The method of claim 2, further comprising:
providing a utilization model of the application modeling a total service demand placed on resources in the system for executing the application therein; and
calibrating the utilization model of the application in accordance with the received performance data being past performance data of the application.

7. The method of claim 1, wherein the received performance data is past performance data of the application, and the method further comprising:
calculating a measured performance of the application by summing up the total service times by the system of the counted number of transactions of all the plurality of transactions types;
comparing the measured performance with the expected performance to determine any difference between the two performances; and
detecting a performance anomaly of the application upon the comparing indicating a difference between the measured performance and the expected performance that is greater than or substantially equal to a predetermined threshold.

8. The method of claim 1, wherein the received performance data is a forecast of future performance data of the application, and the method further comprising:
providing the expected performance as a prediction of a performance of the application executing in the system.

9. The method of claim 1, further comprising:
including in the performance model for calibrating at least an arrival rate at a system resource in the system of the plurality of transactions.

10. The method of claim 1, wherein the application is an enterprise application distributed in a plurality of servers in the system.

11. The method of claim 1, wherein the performance data further includes:
a total service demand placed on each resource in the system by the application executing in the system.

12. The method of claim 1, wherein receiving the performance data of the application comprises:
receiving performance data of the application for multiple predetermined time intervals over a predetermined period of time.

13. The method of claim 1, wherein calibrating the performance model of the application comprises:

determining a value for a typical service time of each of the plurality of transaction types from the performance model in accordance with the received performance data.

14. A method for determining performance of multiple applications consolidating in a system, comprising:
storing a performance model for the multiple applications in a data storage device;
receiving performance data of each of the multiple applications executing individually in the system, the performance data includes a plurality of types of transactions performed by the each application, a first counted number of transactions for each of the plurality of transaction types as performed by the each application, and a total service time by the system of the counted number of transactions of each of the plurality of transaction types for the each application;
calibrating, using a hardware processor, the stored performance model for the multiple applications to be consolidated in the system in accordance with the received performance data of all of the multiple applications, wherein the calibrating includes fitting the performance data to the performance model to determine parameter values for model parameters in the performance model; and
predicting a performance of all of the multiple applications consolidated in the system based on the performance model calibration and the received performance data of all of the multiple applications.

15. The method of claim 14, further comprising:
providing the performance model for calibrating, the performance model is based at least on a queuing time of transactions of each of a multiple applications.

16. The method of claim 15, wherein the received performance data further includes a total service demand placed on each resource in the system by each of the multiple applications, and the queuing time is represented at least by the total service demand.

17. The method of claim 16, wherein the queuing time is further represented by an arrival rate at a resource in the system of the plurality of transactions performed by the multiple applications.

18. A computer readable storage device on which is encoded program code for determining performance of an application in a system, the encoded program code comprising:
program code for storing a performance model for the application in the data storage device;
program code for receiving performance data of the application, the performance data includes a plurality of types of transactions performed by the application, a counted number of transactions for each of the plurality of transaction types as performed by the application, and a total service time by the system of the counted number of transactions of each of the plurality of transaction types;
program code for calibrating the stored performance model of the application in accordance with the received performance data, wherein the calibrating includes fitting the performance data to the performance model to determine parameter values for model parameters in the performance model; and
program code for calculating an expected performance of the application by the system based on the performance model calibration and the received performance data.

19. The computer readable storage device of claim 18, wherein the received performance data is past performance data of the application, and the encoded program code further comprising:
 program code for calculating a measured performance of the application by summing up the total service times by the system of the counted number of transactions of all the plurality of transactions types;
 program code for comparing the measured performance with the expected performance to determine any difference between the two performances; and
 program code for detecting a performance anomaly of the application upon the comparing indicating a difference between the measured performance and the expected performance that is greater than or substantially equal to a predetermined threshold.

20. The computer readable storage device of claim 18, wherein the received performance data is a forecast of future performance data of the application, and the encoded program code further comprising:
 program code for providing the expected performance as a prediction of a performance of the application executing in the system.

* * * * *